(12) United States Patent
Yang et al.

(10) Patent No.: US 10,949,673 B2
(45) Date of Patent: Mar. 16, 2021

(54) TARGET DETECTION METHOD AND DEVICE

(71) Applicant: HANGZHOU HIKVISION DIGITAL TECHNOLOGY CO., LTD., Zhejiang (CN)

(72) Inventors: Ping Yang, Zhejiang (CN); Shiliang Pu, Zhejiang (CN); Di Xie, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 92 days.

(21) Appl. No.: 16/347,626

(22) PCT Filed: Nov. 7, 2017

(86) PCT No.: PCT/CN2017/109745
§ 371 (c)(1),
(2) Date: May 6, 2019

(87) PCT Pub. No.: WO2018/086513
PCT Pub. Date: May 17, 2018

(65) Prior Publication Data
US 2019/0347485 A1 Nov. 14, 2019

(30) Foreign Application Priority Data
Nov. 8, 2016 (CN) .......................... 201610980457.2

(51) Int. Cl.
*G06K 9/00* (2006.01)
*G06K 9/62* (2006.01)
*G06N 3/08* (2006.01)

(52) U.S. Cl.
CPC ..... *G06K 9/00718* (2013.01); *G06K 9/00369* (2013.01); *G06K 9/00744* (2013.01); *G06K 9/6256* (2013.01); *G06N 3/08* (2013.01)

(58) Field of Classification Search
CPC .......... G06K 9/00718; G06K 9/00369; G06K 9/00744; G06K 9/6256; G06K 9/629;
(Continued)

(56) References Cited

U.S. PATENT DOCUMENTS

2016/0300111 A1* 10/2016 Cosatto ............. G06K 9/00718
2016/0343135 A1* 11/2016 De Haan ............. G06K 9/4652
(Continued)

FOREIGN PATENT DOCUMENTS

CN 105787458 * 7/2016 ......... G06K 9/00335
CN 105844239 8/2016
(Continued)

OTHER PUBLICATIONS

He et al, (Spatial Pyramid Pooling in Deep Convolutional Networks for Visual Recognition, IEEE, vol. 37, No. 9, Sep. 2015) (Year: 2015).*

(Continued)

*Primary Examiner* — Amara Abdi
(74) *Attorney, Agent, or Firm* — Meuner Carlin & Curfman LLC (57) ABSTRACT

Embodiments of the present application disclose a target detection method and device, and relate to the technical field of video processing. The method comprises: obtaining an image sequence to be detected from a video to be detected according to an image sequence determining algorithm based on video timing (S101), extracting a first CNN feature of the image sequence to be detected based on a pre-trained CNN model, performing feature fusion on the first CNN feature based on a second CNN feature to obtain a first fused CNN feature of the image sequence to be detected (S102); inputting the first fused CNN feature into the first-level classifier, and obtaining first candidate target regions of the image sequence to be detected from an output of the first-level classifier (S103); determining a first input region of the second-level classifier based on the first candidate target regions (S104); obtaining a third CNN feature of the first input region based on the first fused CNN feature (S105); inputting the third CNN feature into the second-level classifier, and obtaining a target detection result for the
(Continued)

image sequence to be detected based on the output of the second-level classifier (S106).

18 Claims, 3 Drawing Sheets

(58) Field of Classification Search
CPC ............ G06K 9/6281; G06K 9/00771; G06K 9/6277; G06K 9/628; G06N 3/08
See application file for complete search history.

(56) References Cited

U.S. PATENT DOCUMENTS

2017/0169315 A1* 6/2017 Vaca Castano ...... G06K 9/6814
2017/0206431 A1* 7/2017 Sun ..................... G06F 16/5838

FOREIGN PATENT DOCUMENTS

CN 1055844239 * 8/2016 ......... G06K 9/00711
CN 106056628 * 10/2016 ............... G06T 7/20

OTHER PUBLICATIONS

Riahi et al, (Online multi-object tracking by detection based on generative appearance models, Computer Vision and Image Understanding 152 (2016) 88-102) (Year: 2016).*

International Search Report (English) and Written Opinion dated Jan. 26, 2018, from International Application No. PCT/CN2017/0109745, 9 pages.

"Method Summary of CNN Deep-Learning for Target Detection", non-official translation, Jul. 25, 2016, pp. 1-6, URL: blog.csdn.net/tiandijun/article/details/52024412.

He, K. et al. "Spatial Pyramid Pooling in Deep Convolutional Networks for Visual Recognition", IEEE Transactions on Pattern Analysis and Machine Intelligence, 37(9), Jan. 9, 2015, pp. 1904-1916.

Extended Search Report issued in corresponding EP Application No. 17869978.1, dated Oct. 14, 2019; 8 pages.

Riahi, Dorra et al., Online multi-object tracking by detection based on generative appearance models, Computer Vision and Image Understanding, Academic Press, US., vol. 152, Aug. 11, 2016 (Aug. 11, 2016), pp. 88-102.

Kristan, Matej et al., The Visual Object Tracking VOT2016 Challenge Results, Nov. 3, 2016 (Nov. 3, 216), International Conference on Computer Analysis of Images and Patterns. CAIP 2017 Computer Analysis of Images and Patterns; [Lecture Notes in Computer Science; Lect. Notes Computer], Springer, Berlin, Heidelberg, pp. 777-823.

* cited by examiner

TARGET DETECTION METHOD AND DEVICE

The present application claims the priority of a Chinese patent application No. 201610980457.2, filed before China National Intellectual Property Administration on Nov. 8, 2016 and entitled "Target detection method and device", which is incorporated herein by reference in its entirety.

TECHNICAL FIELD

The present application relates to the technical field of video processing, and particularly to a target detection method and device.

BACKGROUND

With the rapid development of network technology and hardware technology, more and more videos appear in people's lives, and the impact of videos on people's lives is growing. For example, surveillance videos obtained with the video surveillance technology enable people to easily and intuitively obtain dynamic information on an entire surveillance scenario.

Taking the above surveillance video as an example, people may need to pay special attention to a target with a certain feature, such as people running fast, people wandering in a specific region, etc. For this purpose, it is needed to detect targets in a video in actual applications.

In the related art, the target detection is generally performed for each single-frame image in a video, and it is detected in the single-frame image whether there is a suspected target region that satisfies a specific feature. For example, the specific feature is a feature of running action. After a suspected target region that satisfies the specific feature is detected in a plurality of single-frame images, a motion trajectory is generated according to the suspected target region detected in the plurality of consecutive single-frame images. Finally, it is detected whether a target with the specific feature is present in the video according to the motion trajectory.

Multi-frame images are usually needed to fully represent the above specific feature, while a single-frame image can only represent features of a target at a certain moment. Therefore, the feature of the target at one moment is likely to be similar to that of other specific features at a certain moment. For example, the action feature of legs when close together in the running action is very similar to that in normal walking. In view of above, there may be an error in the detection of a suspected target region in the single-frame image with the above method, which results a low accuracy of target detection for a video.

SUMMARY

The embodiments of this application disclose a target detection method and device to improve the accuracy of target detection for videos.

To achieve the above objectives, an embodiment of the present application discloses a target detection method, which includes:

obtaining, from a video to be detected, an image sequence to be detected according to an image sequence determining algorithm based on video timing;

extracting a first CNN feature of the image sequence to be detected based on a pre-trained Convolutional Neural Network CNN model, and performing feature fusion on the first CNN feature based on a second CNN feature to obtain a first fused CNN feature of the image sequence to be detected, wherein, the second CNN feature is a CNN feature of a detected image sequence in the video to be detected, and the CNN model includes a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;

inputting the first fused CNN feature into the first-level classifier, and obtaining, from the output of the first-level classifier, first candidate target regions in the image sequence to be detected;

determining a first input region of the second-level classifier based on the first candidate target regions;

obtaining a third CNN feature of the first input region based on the first fused CNN feature;

inputting the third CNN feature into the second-level classifier, and obtaining a target detection result for the image sequence to be detected based on an output of the second-level classifier.

In an implementation of the present application, the step of obtaining, from a video to be detected, an image sequence to be detected according to an image sequence determining algorithm based on video timing includes:

obtaining, from the video to be detected, an image sequence to be detected containing a preset number of images based on a preset image repeatability according to the video timing, wherein, the image repeatability represents the number of repeated images common to two adjacent image sequences obtained from the video to be detected.

In an implementation of the present application, the step of performing feature fusion on the first CNN feature based on a second CNN feature to obtain a first fused CNN feature of the image sequence to be detected includes:

obtaining a third fused CNN feature of a first detected image sequence, wherein, the first detected image sequence is an image sequence that has been detected and is adjacent to the image sequence to be detected according to the video timing, and the third fused CNN feature is determined based on a CNN feature of an image sequence that has been detected before the first detected image sequence;

performing feature fusion on the first CNN feature using the third fused CNN feature to obtain the first fused CNN feature of the image sequence to be detected.

In an implementation of the present application, the step of performing feature fusion on the first CNN feature using the third fused CNN feature to obtain the first fused CNN feature of the image sequence to be detected includes:

performing feature fusion on the first CNN feature and the third fused CNN feature to obtain the first fused CNN feature of the image sequence to be detected based on a pre-trained Recurrent Neural Network RNN model, wherein, the RNN model is obtained by training an RNN based on a fused CNN feature of a first sample image sequence and a CNN feature of a second sample sequence, and the first sample image sequence is a sample image sequence adjacent to and before the second sample image sequence according to the video timing.

In an implementation of the present application, the first-level classifier is obtained by:

determining the labeled region in the sample image sequence;

obtaining the second fused CNN feature;

determining initial sample regions in the sample image sequence based on the labeled region, wherein, for each labeled region, there is at least one sample region in the initial sample regions in which a coincidence between the at least one sample region and the labeled region is larger than a preset threshold;

performing a first training on the CNN using the second fused CNN feature, the labeled region and the initial sample regions to obtain the first-level classifier and a result of the first training.

In an implementation of the present application, the result of the first training contains second candidate target regions;

the second-level classifier is obtained by:

determining a second input region for the second-level classifier based on the second candidate target regions;

obtaining a fourth CNN feature of the second input region based on the second fused CNN feature;

performing a second training on the CNN based on the fourth CNN feature and the labeled region to obtain the second-level classifier.

In an implementation of the present application, the result of the first training further contains first probabilities of the second candidate target regions containing the target;

the step of determining a second input region for the second-level classifier based on the second candidate target regions includes:

selecting, from the second candidate sample regions, the second input region for the second-level classifier based on a preset non-maximum suppression algorithm and the first probabilities.

In an implementation of the present application, the output of the first-level classifier contains second probabilities of the first candidate target regions containing the target;

the step of determining a first input region for the second-level classifier based on the first candidate target regions includes:

selecting, from the first candidate sample regions, the first input region for the second-level classifier based on the non-maximum suppression algorithm and the second probabilities.

To achieve the above objectives, an embodiment of the present application further discloses a target detection device, which includes:

a sequence obtaining module, configured for obtaining, from a video to be detected, an image sequence to be detected according to an image sequence determining algorithm based on video timing;

a feature extracting module, configured for extracting a first CNN feature of the image sequence to be detected based on a pre-trained Convolutional Neural Network CNN model, wherein the CNN model includes a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;

a first feature obtaining module, configured for performing feature fusion on the first CNN feature based on a second CNN feature to obtain a first fused CNN feature of the image sequence to be detected, wherein, the second CNN feature is a CNN feature of a detected image sequence in the video to be detected;

a region obtaining module, configured for inputting the first fused CNN feature into the first-level classifier, and obtaining, from the output of the first-level classifier, first candidate target regions in the image sequence to be detected;

a region determining module, configured for determining a first input region of the second-level classifier based on the first candidate target regions;

a second feature obtaining module, configured for obtaining a third CNN feature of the first input region based on the first fused CNN feature;

a result obtaining module, configured for inputting the third CNN feature into the second-level classifier, and obtaining a target detection result for the image sequence to be detected based on an output of the second-level classifier.

In an implementation of the present application, the sequence obtaining module is specifically configured for obtaining, from the video to be detected, an image sequence to be detected containing a preset number of images based on a preset image repeatability according to the video timing, wherein, the image repeatability represents the number of repeated images common to two adjacent image sequences obtained from the video to be detected.

In an implementation of the present application, the feature obtaining module includes:

a first feature obtaining unit, configured for obtaining a third fused CNN feature of a first detected image sequence, wherein, the first detected image sequence is an image sequence that has been detected and is adjacent to the image sequence to be detected according to the video timing, and the third fused CNN feature is determined based on a CNN feature of an image sequence that has been detected before the first detected image sequence;

a second feature obtaining unit, configured for performing feature fusion on the first CNN feature using the third fused CNN feature to obtain the first fused CNN feature of the image sequence to be detected.

In an implementation of the present application, the second feature obtaining unit is specifically configured for performing feature fusion on the first CNN feature and the third fused CNN feature to obtain the first fused CNN feature of the image sequence to be detected based on a pre-trained Recurrent Neural Network RNN model, wherein, the RNN model is obtained by training an RNN based on a fused CNN feature of a first sample image sequence and a CNN feature of a second sample sequence, and the first sample image sequence is a sample image sequence adjacent to and before the second sample image sequence according to the video timing.

In an implementation of the present application, the target detection device further includes:

a first-level classifier obtaining module configured for obtaining the first-level classifier;

wherein, the first-level classifier obtaining module includes:

a first region determining unit configured for determining the labeled region in the sample image sequence;

a third feature obtaining unit configured for obtaining the second fused CNN feature;

a second region determining unit, configured for determining initial sample regions in the sample image sequence based on the labeled region, wherein, for each labeled region, there is at least one sample region in the initial sample regions in which a coincidence between the at least one sample region and the labeled region is larger than a preset threshold;

a first-level classifier obtaining unit, configured for performing a first training on the CNN using the second fused CNN feature, the labeled region and the initial sample regions to obtain the first-level classifier and a result of the first training.

In an implementation of the present application, the result of the first training contains second candidate target regions;

the target detection device further includes:

a second-level classifier obtaining module configured for obtaining the second-level classifier;

wherein, the second-level classifier obtaining module includes:

a third region determining unit, configured for determining a second input region for the second-level classifier based on the second candidate target regions;

a fourth feature obtaining module, configured for obtaining a fourth CNN feature of the second input region based on the second fused CNN feature;

a second-level classifier obtaining unit, configured for performing a second training on the CNN based on the fourth CNN feature and the labeled region to obtain the second-level classifier.

In an implementation of the present application, the result of the first training further contains first probabilities of the second candidate target regions containing the target;

the third region determining unit is specifically configured for selecting, from the second candidate sample regions, the second input region for the second-level classifier based on a preset non-maximum suppression algorithm and the first probabilities.

In an implementation of the present application, the output of the first-level classifier contains second probabilities of the first candidate target regions containing the target;

the region determining module is specifically configured for selecting, from the first candidate sample regions, the first input region for the second-level classifier of the CNN based on the non-maximum suppression algorithm and the second probabilities.

To achieve the above objectives, an embodiment of the present application further discloses an electronic device, including a processor and a memory, wherein the memory is used to store executable program codes, and the processor runs a program corresponding to the executable program codes stored in the memory by reading the executable program codes, for performing the above target detection method.

To achieve the above objectives, an embodiment of the present application further discloses an executable program code, which is executed to perform the above target detection method.

To achieve the above objectives, an embodiment of the present application further discloses a storage medium, configured for storing executable program codes which are executed to perform the above target detection method.

As can be seen from above, in the embodiments of the present application, an image sequence to be detected is obtained from a video to be detected, and a first CNN feature of the image sequence to be detected is extracted based on a pre-trained CNN model; a first fused CNN feature of the image sequence to be detected is calculated based on a CNN feature of a detected image sequence in the video to be detected and is input into a first-level classifier of the CNN model to obtain first candidate target regions in the image sequence to be detected; after a first input region of a second-level classifier of the CNN model is determined based on the first candidate target regions, a third CNN feature of the first input region is obtained based on the first fused CNN feature, and is input into the second-level classifier of the CNN model; finally, a target detection result for the image sequence to be detected is obtained based on the output of the second-level classifier. In the solutions provided by the embodiments of this application, the CNN feature for determining first candidate target regions is obtained based on the CNN feature of the image sequence to be detected and the CNN feature of the detected image sequence. The CNN features of a series of images instead of only one frame of image are considered, i.e., the correlation between images in a video is considered. Thus, the features of a target in the image can be more accurately reflected, thereby improving the accuracy of target detection for videos.

BRIEF DESCRIPTION OF DRAWINGS

In order to describe the embodiments of the present application and the technical solutions in the prior art more clearly, drawings required for embodiments of the present application and the prior art will be described briefly below. It is obvious that the drawings below are for only some embodiments of the present application, and those skilled in the art can also obtain further drawings based on these drawings without any creative efforts.

DETAILED DESCRIPTION

In order to make the objections, technical solutions as well as advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without any creative work fall into the protection scope defined by the present application.

Figure 1:
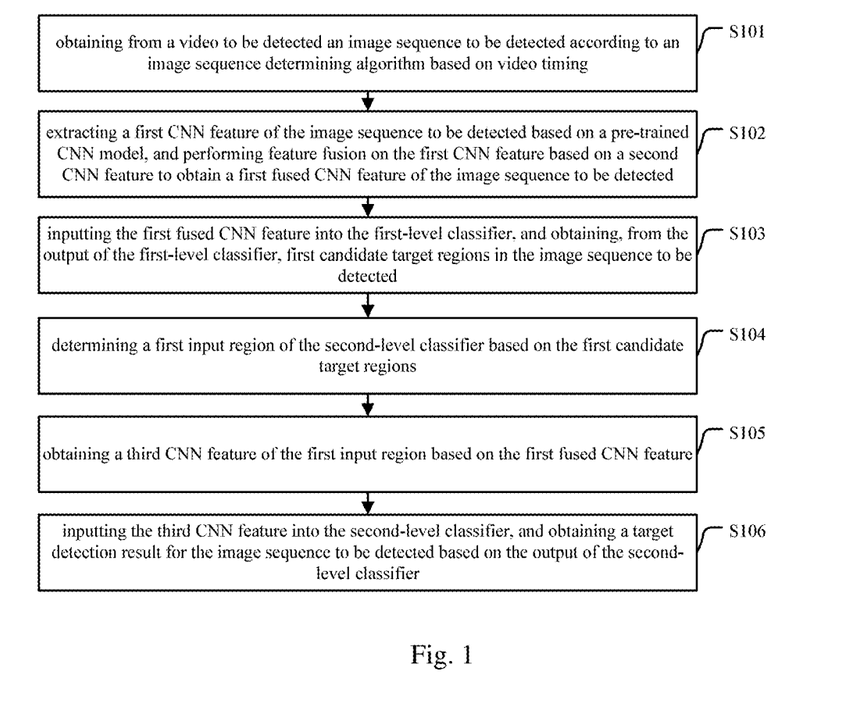
FIG. 1 is a schematic flowchart of a target detection method provided by an embodiment of the present application.

FIG. 1 is a schematic flowchart of a target detection method provided by an embodiment of the present application. The method can be applied to a camera, a video storage device or a server and the like, which is not limited herein. The method includes:

S101: obtaining, from a video to be detected, an image sequence to be detected according to an image sequence determining algorithm based on video timing.

The above video timing can be understood as a playing order, i.e., a display order, of various frames of images in a video.

The above image sequence to be detected can be understood as an image set formed by a certain number of images in the video to be detected in accordance with the above video timing. The certain number can be set to a value such as 1, 2, 3, 5. Preferably, said certain number is set to a value larger than 1.

Specifically, the selection of the above value is generally related to a specific application scenario. If a target needed to be detected is in a static scenario, the above value can be set to a smaller value such as 1. If a target needed to be detected is in a moving scenario, the above value can be set to a slightly larger value, for example, 5, 7 and the like.

In addition, the above image sequence determining algorithm can be related to information such as the number of images to be selected, of course, it can also be related to other information. For example, there is temporal correlation between the images in a video, that is, there is coherence between consecutive images in content. Based on this, in order to obtain better target detection effects, there may be repeated images among the selected images in two adjacent selections when selecting images from a video to be detected so as to determine an image sequence to be detected. As a result, the above image sequence determining algorithm can also be related to the number of repeated images.

Based on the above, in one implementation of the present application, obtaining, from a video to be detected, an image sequence to be detected according to an image sequence determining algorithm based on video timing can include: obtaining, from the video to be detected, an image sequence to be detected containing a preset number of images based on a preset image repeatability according to the video timing.

The above image repeatability represents the number of repeated images common to two adjacent image sequences obtained from the video to be detected, which may be 0, 1, 2, or the like.

In addition, the above preset number may be 3, 4, 5 or the like.

It will be described below through a specific example.

It is assumed that the value of said preset number is 5, and the value of said image repeatability is 2, and the images included in an image sequence obtained from the image to be detected each time are as shown in Table 1 below.

TABLE 1

| obtain for the nth time | the playing order of images in the video to be detected |
|---|---|
| the first time | the 1st, 2nd, 3rd, 4th, 5th frames |
| the second time | the 4th, 5th, 6th, 7th, 8th frames |
| the third time | the 7th, 8th, 9th, 10th, 11th frames |

S102: extracting a first CNN feature of the image sequence to be detected based on a pre-trained CNN (Convolutional Neural Network) model, and performing feature fusion on the first CNN feature based on a second CNN feature to obtain a first fused CNN feature of the image sequence to be detected.

The CNN model includes a first-level classifier and a second-level classifier. The first-level classifier can be obtained by training the CNN based on a second fused CNN feature of a sample image sequence and a labeled region in the sample image sequence where a target is located, the second-level classifier can be obtained by training the CNN based on the second fused CNN feature, the labeled region, and the output of the first-level classifier. The sample image sequence can be a plurality of consecutive images obtained from a sample video according to an image sequence determining algorithm (or one image sequence can be a set of images). Said labeled region can be determined manually.

It should be noted that the image sequence determining algorithm for obtaining a sample image sequence from a sample video needs to be consistent with the algorithm for obtaining an image sequence to be detected from a video to be detected in S101.

When training the CNN, in order to ensure better training results, a variety of sample videos can be selected, for example, a positive sample video containing a target, a negative sample video containing no target, and a video partly containing a target and partly containing no target, and the like.

For details on how to obtain the first-level classifier and the second-level classifier, reference can be made to the embodiments shown in FIG. 2 and FIG. 3 below.

In addition, the second CNN feature includes a CNN feature of the detected image sequence in the video to be detected.

The above CNN feature can be understood as an image feature extracted based on the CNN model. The CNN is a feedforward neural network, its artificial neurons can respond to a part of surrounding units within a coverage region. Applicants have found through extensive experiments that the CNN has excellent performance for large image processing.

Generally, a video to be detected is composed of a plurality of images. Therefore, when performing target detection on a video to be detected, two or more image sequences can be sequentially determined from the video to be detected according to a detection order. Based on this, the image sequence to be detected determined in the above S101 can be divided into the following two cases.

The first case: the image sequence to be detected is the first image sequence of the video to be detected.

The second case: the image sequence to be detected is not the first image sequence of the video to be detected.

When the image sequence to be detected belongs to the second case, target detection may have been performed for other image sequences of the video to be detected. The target detection method provided by the embodiment of the present application can be used to perform target detection on other image sequences before the image sequence to be detected.

It is worth mentioning that said first CNN feature can be understood as a CNN feature determined by all the images included in the image sequence to be detected. For example, if the image sequence to be detected includes two images, the first CNN feature is a CNN feature determined by both of the two images.

There is a temporal correlation among the consecutive images in a video, and said image sequence determining algorithm is based on video timing. Thus, the image sequence to be detected has a correlation with image sequences obtained before, and thus in order to reduce target detection errors, the image sequences determined before the image sequence to be detected can be considered in the target detection process in addition to the feature of the image sequence to be detected.

In view of above, in an implementation of the present application, performing feature fusion on the first CNN feature based on the second CNN feature to obtain a first fused CNN feature of the image sequence to be detected can include: obtaining a third fused CNN feature of a first detected image sequence, and then performing feature fusion on the first CNN feature using the third fused CNN feature to obtain the first fused CNN feature of the image sequence to be detected.

The first detected image sequence is an image sequence that has been detected and is adjacent to the image sequence to be detected according to the video timing, and the third fused CNN feature is determined based on a CNN feature of an image sequence that has been detected before the first detected image sequence.

Since the third fused CNN feature is determined based on the CNN feature of the image sequence that has been detected before the first detected image sequence, when the third fused CNN feature is used for performing feature fusion on the first CNN feature, the CNN feature of the image sequence that has been detected before the image sequence to be detected is also considered, i.e., the CNN feature of the detected image sequence in the video to be detected is considered.

Specifically, said third fused CNN feature can be obtained by performing feature fusion on the CNN feature of the first detected image sequence using a fourth fused CNN feature. The fourth fused CNN feature is determined based on a CNN feature of an image sequence that has been detected before a second detected image sequence, wherein the second detected image sequence is a detected image sequence adjacent to and before the first detected image sequence according to the video timing. In this way, the fused CNN feature of each image sequence can be obtained by feature fusion in a recursive form. That is to say, in this case, the way to obtain the first fused CNN feature is consistent with the way to obtain the third fused CNN feature. Thus, the fused CNN feature of each image sequence of a video to be detected can be obtained in this way.

Alternatively, the third fused CNN feature can also be obtained by other ways, which is not limited in this application.

In an implementation of the present application, performing feature fusion on the first CNN feature using the third fused CNN feature to obtain a first fused CNN feature of the image sequence to be detected can include: performing feature fusion on the first CNN feature and the third fused CNN feature to obtain the first fused CNN feature of the image sequence to be detected based on a pre-trained RNN (Recurrent Neural Network) model.

The RNN model is obtained by training the RNN based on a fused CNN feature of a first sample image sequence and a CNN feature of a second sample sequence, wherein the first sample image sequence is a sample image sequence adjacent to and before the second sample image sequence according to the video timing.

RNN (Recurrent Neural Network) model is a network model characterized by the appearance of loops in the network. The basic components of the RNN model are neurons, and the model can reflect a dependency between the input of a neuron at this moment on the output at a previous moment.

Said neuron can be understood as a mathematical logistic regression model in a neural network.

For feature fusion based on the RNN model, a LSTM (Long Short-Term Memory) layer can be used for feature fusion, or a simple RNN hidden layer can be used for feature fusion. By performing feature fusion on CNN features through the RNN model, the relevant information between adjacent images in a video can be effectively utilized, thus the accuracy of target detection is improved.

S103: inputting the first fused CNN feature into the first-level classifier, and obtaining, from the output of the first-level classifier, first candidate target regions in the image sequence to be detected.

In one case, the output of the first-level classifier can include regions that may contain a target and probabilities of these regions containing the target. The probability of containing the target is higher for some regions, and is lower for some other regions. For this purpose, selection can be performed firstly on these regions, for example, regions whose probabilities are greater than a first preset threshold are selected as the first candidate target regions.

In another case, the first-level classifier can also perform selection on the regions that may contain the target, and only output regions with the probability higher than the first preset threshold. In this case, the first candidate target regions can be obtained directly from the output of the first-level classifier, which are the regions included in the above output. Of course, in this case, the output of the first-level classifier can also include the probability of containing the target for each region outputted.

It can be understood that the first candidate target region corresponds to a corresponding region in each image of the image sequence to be detected since the image sequence to be detected is composed of images.

S104: determining a first input region of the second-level classifier based on the first candidate target regions.

It can be understood that all the first candidate target regions can be directly determined as the first input region, but when there are a large number of the first candidate target regions, the computational burden of the second-level classifier is high. In view of this and in view of that there may be nearby regions in the first candidate target regions, in order to reduce the computational amount, it is possible to perform selection on nearby regions, and only a part of them is reserved for target detection. Based on this, in case that second probabilities of the first candidate target regions containing the target are included in the output of the first-level classifier, determining the first input region of the second-level classifier of the CNN network based on the first candidate target regions can include: selecting the first input region of the second-level classifier of the CNN network from the first candidate target regions based on a non-maximum suppression algorithm and the second probabilities.

Specifically, when selecting the first input region of the second-level classifier from the first candidate target regions based on the non-maximum suppression algorithm and the second probabilities, after nearby regions are found in the first candidate target regions using the non-maximum suppression algorithm, regions can be selected from these found regions in a descending order of the second probabilities. For example, a region with a highest second probability is selected so as to determine the first input region of the second-level classifier.

S105: obtaining a third CNN feature of the first input region based on the first fused CNN feature.

The first fused CNN feature reflects the overall feature of the image sequence to be detected, and different regions in each image may have different features. Thus, in order to detect whether there is a target in each region, it is also necessary to obtain the CNN feature of each region.

Although the first fused CNN feature reflects the overall feature of the image sequence to be detected, it also records a correspondence between different regions in each image of the image sequence to be detected and the specific information in the first fused CNN feature. The specific information corresponding to different regions can be understood as CNN features corresponding to different regions. In addition, the lengths of the CNN features corresponding to different regions are also recorded in the first fused CNN feature. Therefore, the first fused CNN feature also preserves to some extent the spatial information of each image in the image sequence to be detected, so that the first fused CNN feature can be regarded as a multi-channel first fused CNN feature image. That is, for an image in the image sequence to be detected, a fixed-size region corresponds to a fixed-length CNN feature vector in the first fused CNN feature image, that is, one region in the first fused CNN feature image.

Therefore, obtaining a third CNN feature of the first input region based on the first fused CNN feature can include: extracting a CNN feature of the first input region by performing corresponding clipping and scaling operations on the first fused CNN feature image based on a spatial correspondence between each region of an image in the image sequence to be detected and the first fused CNN feature image. The clipping operation is to obtain a feature of a specified region, and the scaling operation is to limit the obtained feature of the specified region to a fixed dimension, thereby ensuring that features of all the regions have the same dimension for subsequent unified processing.

Specifically, a large region of an image in the image sequence to be detected can be divided into M*N small regions. By clipping the first fused CNN feature image, M*N CNN feature vectors in the first fused CNN feature image which correspond to the M*N small regions, i.e., the M*N small images with D channels can be obtained, and then these small images are scaled to fixed-size images with D channels so as to obtain the CNN feature of the above large region, i.e., the CNN features of M*N*D, wherein, D represents the length of the CNN feature vector, M represents the number of small regions in horizontal direction, and N represents the number of small regions in vertical direction.

S106: inputting the third CNN feature into the second-level classifier, and obtaining a target detection result for the image sequence to be detected based on an output of the second-level classifier.

Specifically, the output of the second-level classifier can include a probability of each first input region containing the target. Obtaining a target detection result for the image sequence to be detected based on the output of the second-level classifier can include: determining, from the first input region, a region whose probability is greater than a second preset threshold as a region containing the target in the image sequence to be detected.

In addition, the second-level classifier can perform selection based on the probabilities obtained through analysis and directly output a region whose probability is greater than the second preset threshold in the first input region as the detection result.

It should be noted that the above examples are only illustrative and do not constitute limitations on this application.

How to obtain the above first-level classifier and the second-level classifier is explained below by specific embodiments.

Figure 2:
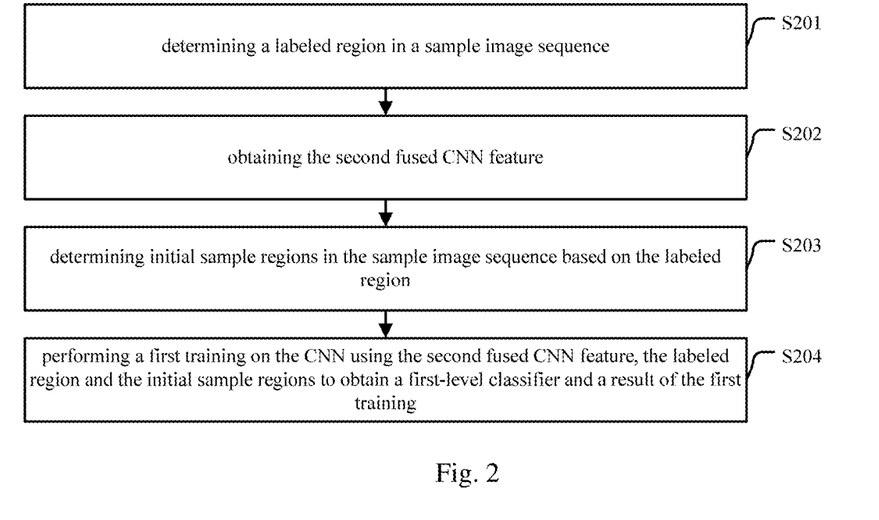
FIG. 2 is a schematic flowchart of a classifier obtaining method provided by an embodiment of the present application.

In one implementation of the present application, referring to FIG. 2, a schematic flowchart of a classifier generating method is provided, which includes:

S201: determining a labeled region in a sample image sequence.

The above sample image sequence is an image sequence obtained from a sample video based on the image sequence determining algorithm described above.

The labeled region can be determined manually.

S202: obtaining the second fused CNN feature.

In one implementation of this application, the second fused CNN feature can be obtained by:

first extracting a fifth CNN feature of the sample image sequence, and then performing feature fusion on the fifth CNN feature based on a sixth CNN feature to obtain the second fused CNN feature of the sample image sequence. The sixth CNN feature includes a CNN feature of a trained image sequence in the sample video.

There is a temporal correlation among the consecutive images in a video, and the sample image sequence is usually determined from a sample video based on video timing. Thus, the sample image sequence has a correlation with an image sequence obtained before it, and thus in order to obtain a more accurate first-level classifier, the image sequence determined before the sample image sequence can be considered in the process of generating the first-level classifier, in addition to the feature of the sample image sequence.

In view of above, in an implementation of the present application, performing feature fusion on the fifth CNN feature based on the sixth CNN feature to obtain the second fused CNN feature can include: obtaining a fifth fused CNN feature of a first trained image sequence, and then performing feature fusion on the fifth CNN feature using the fifth fused CNN feature to obtain the second fused CNN feature of the sample image sequence.

The first trained image sequence is an image sequence that has been trained and is adjacent to the sample image sequence according to the video timing, and the fifth fused CNN feature is determined based on a CNN feature of an image sequence that has been trained before the first trained image sequence.

Since the fifth fused CNN feature is determined based on the CNN feature of the image sequence that has been trained before the first trained image sequence, when the fifth fused CNN feature is used for performing feature fusion on the fifth CNN feature, the CNN feature of the image sequence that has been trained before the sample image sequence is also considered, i.e., the CNN feature of the trained image sequence in the sample video is considered.

Specifically, the fifth fused CNN feature can be obtained by performing feature fusion on the CNN feature of the first trained image sequence using a sixth fused CNN feature. The sixth fused CNN feature is determined based on a CNN feature of an image sequence that has been trained before a second trained image sequence, and the second trained image sequence is a trained image sequence adjacent to and before the first trained image sequence according to the video timing. The fused CNN feature of each image sequence can be obtained by feature fusion in a recursive form. That is to say, in this case, the way to obtain the second fused CNN feature is consistent with the way to obtain the fifth fused CNN feature. Thus, the fused CNN feature of each image sequence of a video to be detected can be obtained in this way.

Alternatively, the fifth fused CNN feature can also be obtained by other ways, which is not limited in this application.

In an implementation of the present application, performing feature fusion on the fifth CNN feature using the fifth fused CNN feature to obtain the second fused CNN feature of the sample image sequence can include: performing feature fusion on the fifth CNN feature and the fifth fused CNN feature to obtain the second fused CNN feature of the sample image sequence based on a pre-trained RNN model.

S203: determining initial sample regions in the sample image sequence based on the labeled region.

For each labeled region, there is at least one sample region in the initial sample regions in which a coincidence between the at least one sample region and the labeled region is larger than a preset threshold.

When determining initial sample regions in the sample image sequence, in addition to the factor of the coincidence, it may be required for the initial sample regions to cover all the regions of each image in the sample image sequence uniformly, so as to ensure that the CNN can be trained with comprehensive information on each image in the sample image sequence.

S204: performing a first training on the CNN using the second fused CNN feature, the labeled region and the initial sample regions to obtain a first-level classifier and a result of the first training.

Specifically, the result of the first training can include regions that may contain a target and probabilities of these regions containing the target.

The regions that may contain a target may be all of the initial sample regions or only a part of them.

Figure 3:
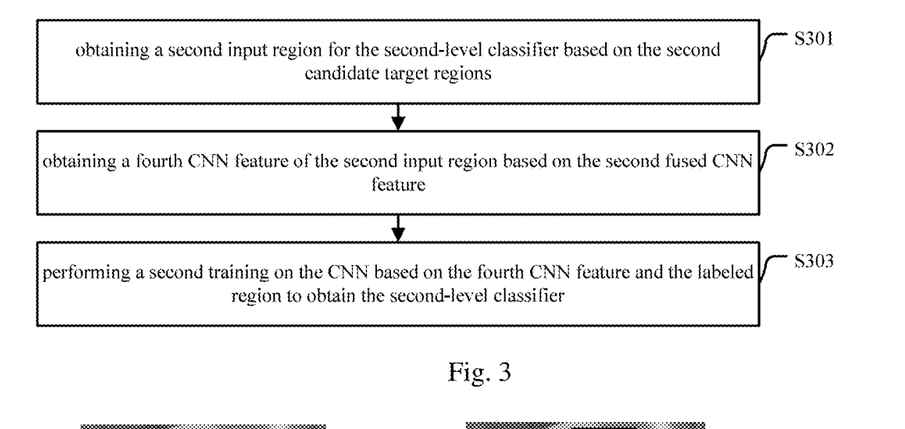
FIG. 3 is a schematic flowchart of another classifier obtaining method provided by an embodiment of the present application.

In one implementation of this application, referring to FIG. 3, a schematic flowchart of another classifier generating method is provided. The result of the first training includes second candidate target regions. The method includes:

S301: obtaining a second input region for the second-level classifier based on the second candidate target regions.

Specifically, all the second candidate target regions can be directly determined as the second input region for the second-level classifier.

There are generally a large number of regions in the second candidate target regions, and among them, there may be regions with low probabilities of containing the target. Thus, in one implementation of this application, regions whose probabilities of containing the target is larger than a third preset threshold in the second candidate target regions can be determined as the second input region.

In addition, there may be nearby regions present in the second candidate target regions. In order to reduce the computational amount at a later stage, the second candidate target regions can also be selected. Based on this, in case that first probabilities of the second candidate target regions containing the target are included in the result of the first training, determining a second input region for the second-level classifier based on the second candidate target regions can include: selecting a second input region for the second-level classifier from the second candidate target regions based on a non-maximum suppression algorithm and the first probabilities.

Of course, the second input region can be determined by combining the above two ways. For example, regions are firstly selected based on the probabilities of containing a target, and then region selection is performed on the selected regions using the non-maximum suppression algorithm and the first probabilities.

It should be noted that the above description is illustrative only in the present application, and the way to determine the second input region is not limited to that in practical applications.

S302: obtaining a fourth CNN feature of the second input region based on the second fused CNN feature.

The second fused CNN feature reflects the overall feature of the sample image sequence, and different regions in each image may have different features. Thus, in order to generate an accurate second-level classifier, it is also necessary to obtain the CNN feature of each region.

Although the second fused CNN feature reflects the overall feature of the sample image sequence, it also records a correspondence between different regions in each image of the sample image sequence and the specific information in the second fused CNN feature. The specific information corresponding to different regions can be understood as CNN features corresponding to different regions. In addition, the lengths of the CNN features corresponding to different regions are also recorded in the second fused CNN feature. Therefore, the second fused CNN feature also preserves to some extent the spatial information of each image in the sample image sequence, so that the second fused CNN feature can be regarded as a multi-channel second fused CNN feature image. That is, for an image in the sample image sequence, a fixed-size region corresponds to a fixed-length CNN feature vector in the second fused CNN feature image, that is, one region in the second fused CNN feature image.

Therefore, obtaining a fourth CNN feature of the second input region based on the second fused CNN feature can include: extracting a CNN feature of the second input region by performing corresponding clipping and scaling operations on the second fused CNN feature image based on a spatial correspondence between each region of an image in the sample image sequence and the second fused CNN feature image. The clipping operation is to obtain a feature of a specified region, and the scaling operation is to limit the feature of the obtained specified region to a fixed dimension, thereby ensuring that the features of all the regions have the same dimension for subsequent unified processing.

Specifically, a large region of an image in the sample image sequence can be divided into M*N small regions. By clipping the second fused CNN feature image, M*N CNN feature vectors in the second fused CNN feature image which correspond to the M*N small regions, i.e., the M*N small images with D channels can be obtained, and then these small images are scaled to fixed-size images with D channels so as to obtain a CNN feature of the large region, i.e., the CNN feature of M*N*D, wherein, D represents the length of the CNN feature vector, M represents the number of small regions in horizontal direction, and N represents the number of small regions in vertical direction.

S303: performing a second training on the CNN based on the fourth CNN feature and the labeled region to obtain the second-level classifier.

As can be seen from above, in each embodiment, an image sequence to be detected is obtained from a video to be detected, and a first CNN feature of the image sequence to be detected is extracted based on a pre-trained CNN model; then, a first fused CNN feature of the image sequence to be detected is calculated based on a CNN feature of a detected image sequence in the video to be detected and is input into a first-level classifier of the CNN model to obtain first candidate target regions in the image sequence to be detected; after a first input region of a second-level classifier of the CNN model is determined based on the first candidate target regions, a third CNN feature of the first input region is obtained based on the first fused CNN feature and is input into the second-level classifier of the CNN model; finally, a target detection result for the image sequence to be detected is obtained based on the output of the second-level classifier. In the solutions provided by each embodiment, the CNN feature for determining first candidate target regions is obtained based on the CNN feature of the image sequence to be detected and the CNN feature of the detected image sequence. The CNN features of a series of images instead of only one frame of image are considered, i.e., the correlation between images in a video is considered. Thus, the features of a target in the image can be more accurately reflected, thereby improving the accuracy of target detection for videos.

The target detection method provided by embodiments of this application will be described below through a specific example.

Assuming that a sample video contains 11 images, the value of the preset number is 5 and the value of the image repeatability is 3, the sample image sequences obtained from the sample video according to video timing are shown in Table 2 below.

TABLE 2

| | the playing order of images in the sample video |
|---|---|
| the first sample image sequence | the 1st, 2nd, 3rd, 4th, 5th frames |
| the second sample image sequence | the 3rd, 4th, 5th, 6th, 7th frames |
| the third sample image sequence | the 5th, 6th, 7th, 8th and 9th frames |
| the fourth sample image sequence | the 7th, 8th, 9th, 10th, 11th frames |

The CNN features for the above four sample image sequences are marked as sample CNN1, sample CNN2, sample CNN3 and sample CNN4. The fused CNN features for the above four sample image sequences are respectively marked as sample fused CNN1, sample fused CNN2, sample fused CNN3 and sample fused CNN4.

Firstly, the calculation process for the above four fused CNN features is introduced below.

1. Sample fused CNN1, which is obtained by performing feature fusion on the sample CNN1 and an initial fused CNN feature, wherein the initial fused CNN feature can be 0;

2. Sample fused CNN2, which is obtained by performing feature fusion on the sample CNN2 and the sample fused CNN1;

3. Sample fused CNN3, which is obtained by performing feature fusion on the sample CNN3 and the sample fused CNN2;

4. Sample fused CNN4, which is obtained by performing feature fusion on the sample CNN3 and the sample fused CNN3.

Take the second sample image sequence as an example to describe how to train the CNN to get the first-level and second-level classifiers.

Referring to FIGS. 4a-4d, four schematic diagrams of a CNN training process are provided.

Figure 4A:
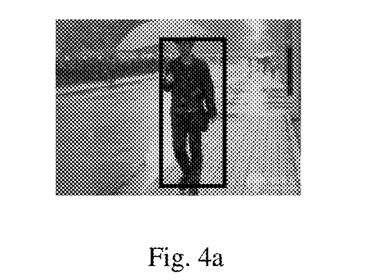
FIG. 4a is the first schematic diagram of a CNN training process provided by an embodiment of the present application.
Figure 4B:
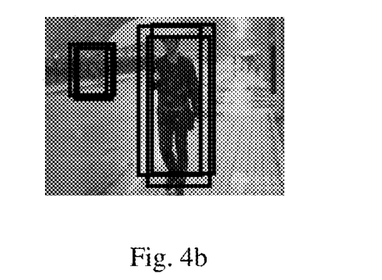
FIG. 4b is the second schematic diagram of the CNN training process provided by an embodiment of the present application.
Figure 4C:
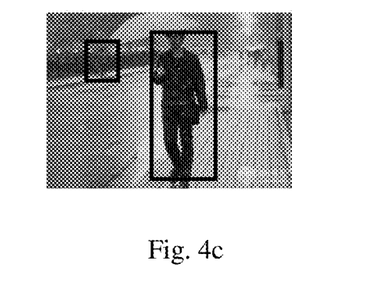
FIG. 4c is the third schematic diagram of the CNN training process provided by an embodiment of the present application.
Figure 4D:
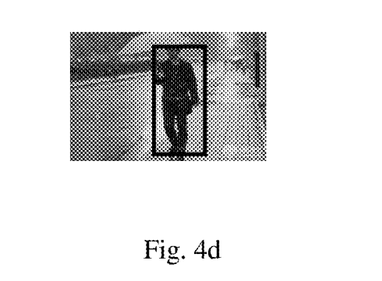
FIG. 4d is the fourth schematic diagram of the CNN training process provided by an embodiment of the present application.

Step 1, manually labeling each image in the second sample image sequence to label a region where a target is located in the image, that is, the labeled region described above, the box region as shown in FIG. 4a;

Step 2, obtaining the sample fused CNN2 by the above method;

Step 3, obtaining initial sample regions in each image of the second sample image sequence based on the labeled region, wherein the sample regions in each image uniformly covers all positions of this image, and for each labeled region, there is at least one sample region in the initial sample regions in which the coincidence between the at least one sample region and the labeled region is larger than a preset threshold;

Step 4: performing a first training on the CNN using the sample fused CNN2, the labeled region and the initial sample regions, to obtain a first-level classifier and second candidate sample regions, i.e., the box region as shown in FIG. 4b;

Step 5, performing selection on the second candidate sample regions based on the non-maximum suppression algorithm and the probability of each second candidate sample region containing a target, to determine a second input region for the second-level classifier, i.e., the box regions as shown in FIG. 4c;

Step 6, obtaining a CNN feature of the second input region based on the sample fused CNN2;

Step 7, performing a second training on the CNN using the CNN feature obtained in step 6 and the labeled region, to obtain the second-level classifier and a region containing the target in the second sample image sequence, i.e., the box region as shown in FIG. 4d.

The description above is just an example of how to train a CNN using a sample image sequence. In practice, a large number of samples are needed to train a CNN, but the training process using each sample image sequence is similar to the above process.

Next, an image sequence to be detected is taken as an example to introduce the process of target detection.

Assuming that a video to be detected contains seven images, two image sequences to be detected can be obtained from the video to be detected by using the CNN model trained above.

An image sequence 1 to be detected contains the 1st, 2nd, 3rd, 4th, 5th frames.

An image sequence 2 to be detected contains the 3rd, 4th, 5th, 6th, 7th frames.

Figure 4E:
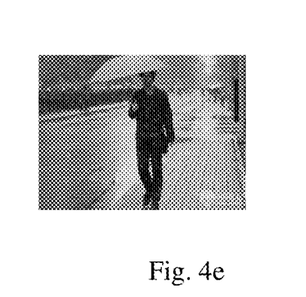
FIG. 4e is the first schematic diagram of a target detection process provided by an embodiment of the present application.

Referring to FIGS. 4e-4h, four schematic diagrams of a target detection process are provided, wherein, FIG. 4e is an image contained in the image sequence to be detected.

The target detection process for the image sequence 1 to be detected is as follows.

Step 1, extracting a CNN feature of the image sequence 1 to be detected based on the CNN model trained above, the CNN feature being marked as detection CNN1;

Step 2, performing feature fusion on the detection CNN1 and the initial fused CNN feature, to obtain a fused CNN feature of the image sequence 1 to be detected, which is marked as fused detection CNN1;

Step 3, inputting the fused detection CNN1 into the first-level classifier to obtain candidate target regions 1;

Step 4, performing selection on the candidate target regions 1 using a non-maximum suppression algorithm and the probabilities of the candidate target regions 1 containing the target, to determine an input region 1 of the second-level classifier;

Step 5, obtaining a CNN feature of the input region 1 based on the fused detection CNN1;

Step 6, inputting the CNN feature obtained in step 5 into the second-level classifier, to obtain a target detection result for the image sequence 1 to be detected.

The target detection process for the image sequence 2 to be detected is as follows.

Figure 4F:
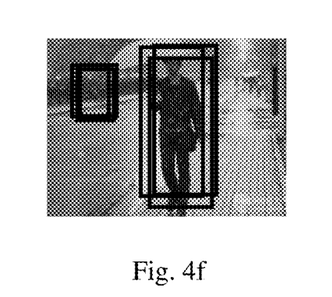
FIG. 4f is the second schematic diagram of the target detection process provided by an embodiment of the present application.
Figure 4G:
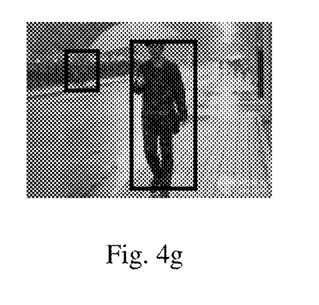
FIG. 4g is the third schematic diagram of the target detection process provided by an embodiment of the present application.
Figure 4H:
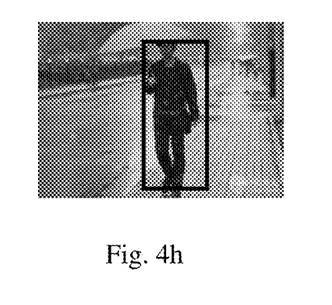
FIG. 4h is the fourth schematic diagram of the target detection process provided by an embodiment of the present application.

Step 7, extracting a CNN feature of the image sequence 2 to be detected based on the CNN model trained above, the CNN feature being marked as detection CNN2;

Step 8, performing feature fusion on the detection CNN2 and the fused detection CNN1 to obtain a fused CNN feature of the image sequence 2 to be detected, which is marked as fused detection CNN2;

Step 9, inputting the fused detection CNN2 into the first-level classifier to obtain candidate target regions 2, i.e., the box regions as shown in FIG. 4*f*;

Step 10, performing selection on the candidate target regions 2 using a non-maximum suppression algorithm and the probabilities of the candidate target region 2 containing the target, to determine an input region 2 of the second-level classifier, i.e., the box regions as shown in FIG. 4*g*;

Step 11, obtaining a CNN feature of the input region 2 based on the fused detection CNN2;

Step 12, inputting the CNN feature obtained in step 11 into the second-level classifier, to obtain a target detection result for the image sequence 2 to be detected, wherein, a region where the target is located is the box region as shown in FIG. 4*h*.

Corresponding to the above target detection method, an embodiment of the present application further provides a target detection device.

Figure 5:
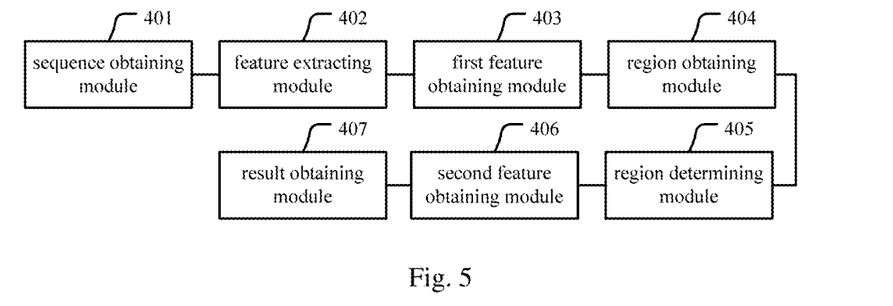
FIG. 5 is a schematic structural diagram of a target detection device provided by an embodiment of the present application.

FIG. 5 is a schematic structural diagram of a target detection device provided by an embodiment of the present application, which includes:

a sequence obtaining module 401, configured for obtaining, from a video to be detected, an image sequence to be detected according to an image sequence determining algorithm based on video timing;

a feature extracting module 402, configured for extracting a first CNN feature of the image sequence to be detected based on a pre-trained Convolutional Neural Network CNN model, wherein the CNN model includes a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;

a first feature obtaining module 403, configured for performing feature fusion on the first CNN feature based on a second CNN feature to obtain a first fused CNN feature of the image sequence to be detected, wherein, the second CNN feature is a CNN feature of a detected image sequence in the video to be detected;

a region obtaining module 404, configured for inputting the first fused CNN feature into the first-level classifier, and obtaining, from the output of the first-level classifier, first candidate target regions in the image sequence to be detected;

a region determining module 405, configured for determining a first input region of the second-level classifier based on the first candidate target regions;

a second feature obtaining module 406, configured for obtaining a third CNN feature of the first input region based on the first fused CNN feature;

a result obtaining module 407, configured for inputting the third CNN feature into the second-level classifier, and obtaining a target detection result for the image sequence to be detected based on an output of the second-level classifier.

Optionally, the sequence obtaining module 401 is specifically configured for obtaining, from the video to be detected, an image sequence to be detected containing a preset number of images based on a preset image repeatability according to the video timing, wherein, the image repeatability represents the number of repeated images common to two adjacent image sequences obtained from the video to be detected.

Optionally, the feature obtaining module 403 includes:

a first feature obtaining unit, configured for obtaining a third fused CNN feature of a first detected image sequence, wherein, the first detected image sequence is an image sequence that has been detected and is adjacent to the image sequence to be detected according to the video timing, and the third fused CNN feature is determined based on a CNN feature of an image sequence that has been detected before the first detected image sequence;

a second feature obtaining unit, configured for performing feature fusion on the first CNN feature using the third fused CNN feature to obtain the first fused CNN feature of the image sequence to be detected.

Optionally, the second feature obtaining unit is specifically configured for performing feature fusion on the first CNN feature and the third fused CNN feature to obtain the first fused CNN feature of the image sequence to be detected based on a pre-trained Recurrent Neural Network RNN model, wherein, the RNN model is obtained by training an RNN based on a fused CNN feature of a first sample image sequence and a CNN feature of a second sample sequence, and the first sample image sequence is a sample image sequence adjacent to and before the second sample image sequence according to the video timing.

Figure 6:
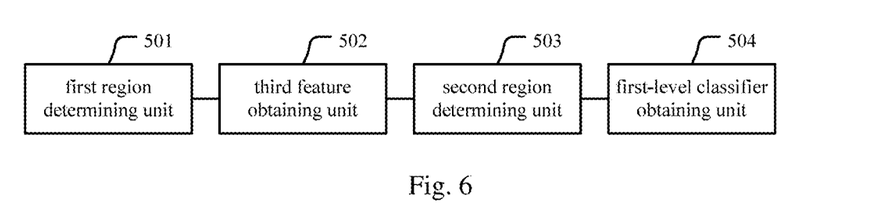
FIG. 6 is a schematic structural diagram of a classifier obtaining device provided by an embodiment of the present application.

In one implementation of the present application, the target detection device provided by the present application further includes:

a first-level classifier obtaining module, configured for obtaining the first-level classifier. Referring to FIG. 6, a schematic structural diagram of a classifier obtaining device, i.e., a first-level classifier obtaining module, is provided, which includes:

a first region determining unit 501, configured for determining the labeled region in the sample image sequence;

a third feature obtaining unit 502, configured for obtaining the second fused CNN feature;

a second region determining unit 503, configured for determining initial sample regions in the sample image sequence based on the labeled region, wherein, for each labeled region, there is at least one sample region in the initial sample regions in which coincidence between the at least one sample region and the labeled region is larger than a preset threshold;

a first-level classifier obtaining unit 504, configured for performing a first training on the CNN using the second fused CNN feature, the labeled region and the initial sample regions to obtain the first-level classifier and a result of the first training.

Figure 7:
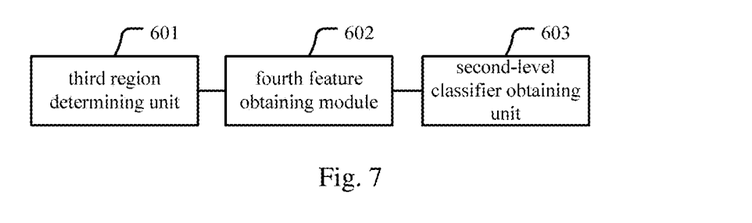
FIG. 7 is a schematic structural diagram of another classifier obtaining device provided by an embodiment of the present application.

In one implementation of the present application, the result of the first training contains second candidate target regions; the target detection device provided by the present application further includes:

a second-level classifier obtaining module, configured for obtaining the second-level classifier; Referring to FIG. 7, a schematic structural diagram of another classifier obtaining device, i.e., a second-level classifier obtaining module, is provided, which includes:

a third region determining unit 601, configured for determining a second input region for the second-level classifier based on the second candidate target regions;

a fourth feature obtaining module 602, configured for obtaining a fourth CNN feature of the second input region based on the second fused CNN feature;

a second-level classifier obtaining unit 603, configured for performing a second training on the CNN based on the fourth CNN feature and the labeled region to obtain the second-level classifier.

Optionally, the result of the first training further contains first probabilities of the second candidate target regions containing the target.

The third region determining unit 601 is specifically configured for selecting, from the second candidate sample regions, the second input region for the second-level classifier based on a preset non-maximum suppression algorithm and the first probabilities.

Optionally, the output of the first-level classifier contains second probabilities of the first candidate target regions containing the target.

The region determining module 405 is specifically configured for selecting, from the first candidate sample regions, the first input region for the second-level classifier of the CNN based on the non-maximum suppression algorithm and the second probabilities.

As can be seen from above, in each embodiment, an image sequence to be detected is obtained from a video to be detected, and a first CNN feature of the image sequence to be detected is extracted based on a pre-trained CNN model; then, a first fused CNN feature of the image sequence to be detected is calculated based on a CNN feature of a detected image sequence in the video to be detected and is input into a first-level classifier of the CNN model to obtain first candidate target regions in the image sequence to be detected; after a first input region of a second-level classifier of the CNN model is determined based on the first candidate target regions, a third CNN feature of the first input region is obtained based on the first fused CNN feature, and is input into the second-level classifier of the CNN model; finally, a target detection result for the image sequence to be detected is obtained based on the output of the second-level classifier. In the solutions provided by each embodiment, the CNN feature for determining first candidate target regions is obtained based on the CNN feature of the image sequence to be detected and the CNN feature of the detected image sequence. The CNN features of a series of images instead of only one frame of image are considered, i.e., the correlation between images in a video is considered. Thus, the features of a target in the image can be more accurately reflected, thereby improving the accuracy of target detection for videos.

The embodiments of the device are briefly described and reference can be made to the description of the embodiments of the method for its related contents since the embodiments of the device are substantially similar to those of the method.

Figure 8:
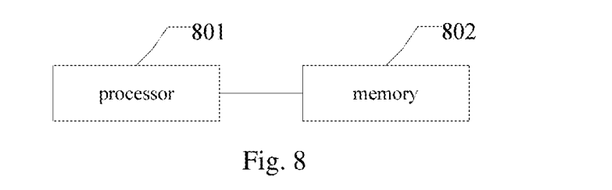
FIG. 8 is a schematic structural diagram of an electronic device provided by an embodiment of the present application.

An embodiment of the present application further provides an electronic device as shown in FIG. 8. The electronic device includes a processor 801 and a memory 802, wherein the memory 802 is used to store executable program codes, and the processor 801 runs a program corresponding to the executable program codes stored in the memory 802 by reading the executable program codes, for performing the target detection method, which includes:

obtaining, from a video to be detected, an image sequence to be detected according to an image sequence determining algorithm based on video timing;

extracting a first CNN feature of the image sequence to be detected based on a pre-trained CNN model, and performing feature fusion on the first CNN feature based on a second CNN feature to obtain a first fused CNN feature of the image sequence to be detected, wherein, the second CNN feature is a CNN feature of a detected image sequence in the video to be detected, and the CNN model includes a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;

inputting the first fused CNN feature into the first-level classifier, and obtaining, from the output of the first-level classifier, first candidate target regions in the image sequence to be detected;

determining a first input region of the second-level classifier based on the first candidate target regions;

obtaining a third CNN feature of the first input region based on the first fused CNN feature;

inputting the third CNN feature into the second-level classifier, and obtaining a target detection result for the image sequence to be detected based on an output of the second-level classifier.

The electronic device can be a camera, a video storage device or a server, etc., which is not limited in the present application.

The memory mentioned above for the electronic device can include a Random Access Memory (RAM) or a Non-Volatile Memory (NVM), such as at least one disk memory. Optionally, the memory can also be at least one storage device located far from the aforementioned processor.

The processor can be a general purpose processor, including a central processing unit (CPU), a network processor (NP), etc. It can also be a digital signal processor (DSP), an application specific integrated circuit (ASIC), a field-programmable gate array (FPGA) or another programmable logic device, a discrete gate or a transistor logic device, a discrete hardware component.

With the embodiment of the present application as shown in FIG. 8, an image sequence to be detected is obtained from a video to be detected, and a first CNN feature of the image sequence to be detected is extracted based on a pre-trained CNN model; then, a first fused CNN feature of the image sequence to be detected is calculated based on a CNN feature of a detected image sequence in the video to be detected and is input into a first-level classifier of the CNN model to obtain first candidate target regions in the image sequence to be detected; after a first input region of a second-level classifier of the CNN model is determined based on the first candidate target regions, a third CNN feature of the first input region is obtained based on the first fused CNN feature, and is input into the second-level classifier of the CNN model; finally, a target detection result for the image sequence to be detected is obtained based on the output of the second-level classifier. In the solutions provided by the embodiments of this application, the CNN feature for determining first candidate target regions is obtained based on the CNN feature of the image sequence to be detected and the CNN feature of the detected image sequence. The CNN features of a series of images instead of only one frame of image are considered, i.e., the correlation between images in a video is considered. Thus, the features of a target in the image can be more accurately reflected, thereby improving the accuracy of target detection for videos.

An embodiment of the present application further provides an executable program code, which is executed to perform the target detection method. The method includes:

obtaining, from a video to be detected, an image sequence to be detected according to an image sequence determining algorithm based on video timing;

extracting a first CNN feature of the image sequence to be detected based on a pre-trained CNN model, and performing feature fusion on the first CNN feature based on a second CNN feature to obtain a first fused CNN feature of the image sequence to be detected, wherein, the second CNN feature is a CNN feature of a detected image sequence in the video to be detected, and the CNN model includes a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;

inputting the first fused CNN feature into the first-level classifier, and obtaining, from the output of the first-level classifier, first candidate target regions in the image sequence to be detected;

determining a first input region of the second-level classifier based on the first candidate target regions;

obtaining a third CNN feature of the first input region based on the first fused CNN feature;

inputting the third CNN feature into the second-level classifier, and obtaining a target detection result for the image sequence to be detected based on an output of the second-level classifier.

With the embodiments of the present application, an image sequence to be detected is obtained from a video to be detected, and a first CNN feature of the image sequence to be detected is extracted based on a pre-trained CNN model; then, a first fused CNN feature of the image sequence to be detected is calculated based on a CNN feature of a detected image sequence in the video to be detected and is input into a first-level classifier of the CNN model to obtain first candidate target regions in the image sequence to be detected; after a first input region of a second-level classifier of the CNN model is determined based on the first candidate target regions, a third CNN feature of the first input region is obtained based on the first fused CNN feature, and is input into the second-level classifier of the CNN model; finally, a target detection result for the image sequence to be detected is obtained based on the output of the second-level classifier. In the solutions provided by the embodiments of this application, the CNN feature for determining first candidate target regions is obtained based on the CNN feature of the image sequence to be detected and the CNN feature of the detected image sequence. The CNN features of a series of images instead of only one frame of image are considered, i.e., the correlation between images in a video is considered. Thus, the features of a target in the image can be more accurately reflected, thereby improving the accuracy of target detection for videos.

An embodiment of the present application further provides a storage medium used to store executable program codes, the executable program codes are executed to perform the target detection method, which includes:

obtaining, from a video to be detected, an image sequence to be detected according to an image sequence determining algorithm based on video timing;

extracting a first CNN feature of the image sequence to be detected based on a pre-trained CNN model, and performing feature fusion on the first CNN feature based on a second CNN feature to obtain a first fused CNN feature of the image sequence to be detected, wherein, the second CNN feature is a CNN feature of a detected image sequence in the video to be detected, and the CNN model includes a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;

inputting the first fused CNN feature into the first-level classifier, and obtaining, from the output of the first-level classifier, first candidate target regions in the image sequence to be detected;

determining a first input region of the second-level classifier based on the first candidate target regions;

obtaining a third CNN feature of the first input region based on the first fused CNN feature;

inputting the third CNN feature into the second-level classifier, and obtaining a target detection result for the image sequence to be detected based on an output of the second-level classifier.

With the embodiments of the present application, an image sequence to be detected is obtained from a video to be detected, and a first CNN feature of the image sequence to be detected is extracted based on a pre-trained CNN model; then, a first fused CNN feature of the image sequence to be detected is calculated based on a CNN feature of a detected image sequence in the video to be detected and is input into a first-level classifier of the CNN model to obtain first candidate target regions in the image sequence to be detected; after a first input region of a second-level classifier of the CNN model is determined based on the first candidate target regions, a third CNN feature of the first input region is obtained based on the first fused CNN feature, and is input into the second-level classifier of the CNN model; finally, a target detection result for the image sequence to be detected is obtained based on the output of the second-level classifier. In the solutions provided by the embodiments of this application, the CNN feature for determining first candidate target regions is obtained based on the CNN feature of the image sequence to be detected and the CNN feature of the detected image sequence. The CNN features of a series of images instead of only one frame of image are considered, i.e., the correlation between images in a video is considered. Thus, the features of a target in the image can be more accurately reflected, thereby improving the accuracy of target detection for videos.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices including a series of elements include not only those elements listed, but also other elements not specifically listed or the elements intrinsic to these processes, methods, articles, or devices. Without further limitations, elements limited by the wording "include(s) a/an . . . " do not exclude that there are additional identical elements in the processes, methods, articles, or devices which include the listed elements.

All embodiments in the description are described in a correlated manner, and identical or similar parts in various embodiments can be referred to one another, the description for each embodiment all focuses on the differences with other embodiments. Especially, the embodiments of a target detection device, an electronic device, an executable program code and a storage medium are briefly described and reference can be made to the description of the embodiments of a target detection method for its related contents since the embodiments of the device are substantially similar to those of the target detection method.

It can be understood by a person skilled in the art that all or a part of steps in the implementations of the above method can be carried out by related hardware being instructed by programs, which can be stored in computer readable storage medium, such as ROM/RAM, disk and optical disk etc.

The embodiments described above are just preferable embodiments of the present application, and not indented to limit the present application. Any modifications, alternatives, improvements or the like made within the spirit and principle of the present application shall be included in the protection scope of the present application.

What is claimed is:

1. A target detection method, comprising:
   obtaining, from a video to be detected, an image sequence to be detected according to an image sequence determining algorithm based on video timing;
   extracting a first CNN feature of the image sequence to be detected based on a pre-trained Convolutional Neural Network CNN model, and performing feature fusion on the first CNN feature of the image sequence based on a second CNN feature to obtain a first fused CNN feature of the image sequence to be detected, wherein, the second CNN feature is a CNN feature of a detected image sequence in the video to be detected, and the CNN model comprises a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;
   inputting the first fused CNN feature into the first-level classifier, and obtaining, from the output of the first-level classifier, first candidate target regions in the image sequence to be detected;
   determining a first input region of the second-level classifier based on the first candidate target regions;
   obtaining a third CNN feature of the first input region based on the first fused CNN feature;
   inputting the third CNN feature into the second-level classifier, and obtaining a target detection result for the image sequence to be detected based on an output of the second-level classifier.

2. The method of claim 1, wherein, the step of obtaining, from the video to be detected, the image sequence to be detected according to the image sequence determining algorithm based on video timing comprises:
   obtaining, from the video to be detected, the image sequence to be detected comprising a preset number of images based on a preset image repeatability according to the video timing, wherein, the image repeatability represents the number of repeated images which are common to two adjacent image sequences obtained from the video to be detected.

3. The method of claim 1, wherein, the step of performing feature fusion on the first CNN feature based on the second CNN feature to obtain the first fused CNN feature of the image sequence to be detected comprises:
   obtaining a third fused CNN feature of a first detected image sequence, wherein, the first detected image sequence is an image sequence that has been detected and is adjacent to the image sequence to be detected according to the video timing, and the third fused CNN feature is determined based on a CNN feature of an image sequence that has been detected before the first detected image sequence;
   performing feature fusion on the first CNN feature using the third fused CNN feature to obtain the first fused CNN feature of the image sequence to be detected.

4. The method of claim 3, wherein, the step of performing feature fusion on the first CNN feature using the third fused CNN feature to obtain the first fused CNN feature of the image sequence to be detected comprises:
   performing feature fusion on the first CNN feature and the third fused CNN feature to obtain the first fused CNN feature of the image sequence to be detected based on a pre-trained Recurrent Neural Network RNN model, wherein, the RNN model is obtained by training an RNN based on a fused CNN feature of a first sample image sequence and a CNN feature of a second sample sequence, and the first sample image sequence is a sample image sequence adjacent to and before the second sample image sequence according to the video timing.

5. The method of claim 1, wherein, the first-level classifier is obtained by:
   determining the labeled region in the sample image sequence;
   obtaining the second fused CNN feature;
   determining initial sample regions in the sample image sequence based on the labeled region, wherein, for each labeled region, there is at least one sample region in the initial sample regions in which a coincidence between the at least one sample region and the labeled region is larger than a preset threshold;

performing a first training on the CNN using the second fused CNN feature, the labeled region and the initial sample regions to obtain the first-level classifier and a result of the first training.

6. The method of claim 5, wherein, the result of the first training comprises second candidate target regions;

the second-level classifier is obtained by:
determining a second input region for the second-level classifier based on the second candidate target regions;
obtaining a fourth CNN feature of the second input region based on the second fused CNN feature;
performing a second training on the CNN based on the fourth CNN feature and the labeled region to obtain the second-level classifier.

7. The method of claim 6, wherein, the result of the first training further comprises first probabilities of the second candidate target regions containing the target;

the step of determining a second input region for the second-level classifier based on the second candidate target regions comprises:
selecting, from the second candidate sample regions, the second input region for the second-level classifier based on a preset non-maximum suppression algorithm and the first probabilities.

8. The method of claim 7, wherein, the output of the first-level classifier comprises second probabilities of the first candidate target regions containing the target;

the step of determining a first input region for the second-level classifier based on the first candidate target regions comprises:
selecting, from the first candidate sample regions, the first input region for the second-level classifier based on the non-maximum suppression algorithm and the second probabilities.

9. A target detection device, comprising:
a sequence obtaining module, configured for obtaining, from a video to be detected, an image sequence to be detected according to an image sequence determining algorithm based on video timing;
a feature extracting module, configured for extracting a first CNN feature of the image sequence to be detected based on a pre-trained Convolutional Neural Network CNN model, wherein the CNN model comprises a first-level classifier and a second-level classifier, wherein, the first-level classifier is a classifier obtained by training a CNN based on a second fused CNN feature of a sample image sequence and a labeled region in the sample image sequence where a target is located, the second-level classifier is a classifier obtained by training the CNN based on the second fused CNN feature, the labeled region, and an output of the first-level classifier, and the sample image sequence is an image sequence obtained from a sample video according to the image sequence determining algorithm;
a first feature obtaining module, configured for performing feature fusion on the first CNN feature of the image sequence based on a second CNN feature to obtain a first fused CNN feature of the image sequence to be detected, wherein the second CNN feature is a CNN feature of a detected image sequence in the video to be detected;

a region obtaining module, configured for inputting the first fused CNN feature into the first-level classifier, and obtaining, from the output of the first-level classifier, first candidate target regions in the image sequence to be detected;
a region determining module, configured for determining a first input region of the second-level classifier based on the first candidate target regions;
a second feature obtaining module, configured for obtaining a third CNN feature of the first input region based on the first fused CNN feature;
a result obtaining module, configured for inputting the third CNN feature into the second-level classifier, and obtaining a target detection result for the image sequence to be detected based on an output of the second-level classifier.

10. The device of claim 9, wherein
the sequence obtaining module is specifically configured for obtaining, from the video to be detected, the image sequence to be detected comprising a preset number of images based on a preset image repeatability according to the video timing, wherein, the image repeatability represents the number of repeated images which are common to two adjacent image sequences obtained from the video to be detected.

11. The device of claim 9, wherein the feature obtaining module comprises:
a first feature obtaining unit, configured for obtaining a third fused CNN feature of a first detected image sequence, wherein, the first detected image sequence is an image sequence that has been detected and is adjacent to the image sequence to be detected according to the video timing, and the third fused CNN feature is determined based on a CNN feature of an image sequence that has been detected before the first detected image sequence;
a second feature obtaining unit, configured for performing feature fusion on the first CNN feature using the third fused CNN feature to obtain the first fused CNN feature of the image sequence to be detected.

12. The device of claim 11, wherein
the second feature obtaining unit is specifically configured for performing feature fusion on the first CNN feature and the third fused CNN feature to obtain the first fused CNN feature of the image sequence to be detected based on a pre-trained Recurrent Neural Network RNN model, wherein, the RNN model is obtained by training an RNN based on a fused CNN feature of a first sample image sequence and a CNN feature of a second sample sequence, and the first sample image sequence is a sample image sequence adjacent to and before the second sample image sequence according to the video timing.

13. The device of claim 9, wherein the device further comprises:
a first-level classifier obtaining module, configured for obtaining the first-level classifier;
wherein, the first-level classifier obtaining module comprises:
a first region determining unit, configured for determining the labeled region in the sample image sequence;
a third feature obtaining unit, configured for obtaining the second fused CNN feature;
a second region determining unit, configured for determining initial sample regions in the sample image sequence based on the labeled region, wherein, for each labeled region, there is at least one sample region in the initial sample regions in which a coincidence between the at least one sample region and the labeled region is larger than a preset threshold;

a first-level classifier obtaining unit, configured for performing a first training on the CNN using the second fused CNN feature, the labeled region and the initial sample regions to obtain the first-level classifier and a result of the first training.

14. The device of claim 13, wherein the result of the first training comprises second candidate target regions;

the device further comprises:

a second-level classifier obtaining module, configured for obtaining the second-level classifier;

wherein, the second-level classifier obtaining module comprises:

a third region determining unit, configured for determining a second input region for the second-level classifier based on the second candidate target regions;

a fourth feature obtaining module, configured for obtaining a fourth CNN feature of the second input region based on the second fused CNN feature;

a second-level classifier obtaining unit, configured for performing a second training on the CNN based on the fourth CNN feature and the labeled region to obtain the second-level classifier.

15. The device of claim 14, wherein the result of the first training further comprises first probabilities of the second candidate target regions containing the target;

the third region determining unit is specifically configured for selecting, from the second candidate sample regions, the second input region for the second-level classifier based on a preset non-maximum suppression algorithm and the first probabilities.

16. The device of claim 15, wherein the output of the first-level classifier comprises second probabilities of the first candidate target regions containing the target;

the region determining module is specifically configured for selecting, from the first candidate sample regions, the first input region for the second-level classifier of the CNN based on the non-maximum suppression algorithm and the second probabilities.

17. An electronic device, comprising a processor and a memory, wherein the memory is used to store executable program codes, and the processor runs a program corresponding to the executable program codes stored in the memory by reading the executable program codes, for performing the target detection method of claim 1.

18. A non-transitory storage medium, configured for storing executable program codes which are executed to perform the target detection method of claim 1.

* * * * *